United States Patent
Pau

(10) Patent No.: US 9,571,398 B2
(45) Date of Patent: Feb. 14, 2017

(54) METHOD FOR EXTRACTING FEATURES FROM A FLOW OF DIGITAL VIDEO FRAMES, AND CORRESPONDING SYSTEM AND COMPUTER PROGRAM PRODUCT

(71) Applicant: STMicroelectronics S.R.L., Agrate Brianza (IT)

(72) Inventor: Danilo Pietro Pau, Sesto San Giovanni (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 408 days.

(21) Appl. No.: 14/080,080

(22) Filed: Nov. 14, 2013

(65) Prior Publication Data

US 2014/0133310 A1     May 15, 2014

(30) Foreign Application Priority Data

Nov. 14, 2012   (IT) .............................. TO2012A0986

(51) Int. Cl.
| | |
|---|---|
| H04L 12/801 | (2013.01) |
| H04N 19/115 | (2014.01) |
| H04N 19/164 | (2014.01) |
| H04N 19/17 | (2014.01) |
| G06K 9/46 | (2006.01) |
| G06F 17/30 | (2006.01) |

(52) U.S. Cl.
CPC ......... *H04L 47/12* (2013.01); *G06F 17/30799* (2013.01); *G06K 9/4671* (2013.01); *H04N 19/115* (2014.11); *H04N 19/164* (2014.11); *H04N 19/17* (2014.11)

(58) Field of Classification Search
CPC .......... G06K 9/36; G06K 9/46; G06K 9/4604; G06K 9/4642; G06K 9/4652; G06K 9/4671; H04L 47/10; H04L 47/12; H04L 47/25

See application file for complete search history.

(56) References Cited

U.S. PATENT DOCUMENTS

| | | | |
|---|---|---|---|
| 2007/0003165 A1* | 1/2007 | Sibiryakov | .......... G06K 9/6211 382/294 |
| 2008/0101715 A1* | 5/2008 | Barnes | ................. G06K 9/4671 382/264 |

(Continued)

OTHER PUBLICATIONS

Danilo Pietro Pau, :"Procedimenti Per La Codifica E La Decodifica Di Flussi Di Frame Video Digital!, Relativi Sistemi E Prodotti Informatici", Italian patent application No. TO2012A000985, filed Nov. 14, 2012, Torino, Italy, 46 pages.

(Continued)

*Primary Examiner* — Feben M Haile
(74) *Attorney, Agent, or Firm* — Seed IP Law Group LLP

(57) ABSTRACT

In an embodiment, digital video frames in a flow are subjected to a method of extraction of features including the operations of: extracting from the video frames respective sequences of pairs of keypoints/descriptors limiting to a threshold value the number of pairs extracted for each frame; sending the sequences extracted from an extractor module to a server for processing with a bitrate value variable in time; receiving the aforesaid bitrate value variable in time at the extractor as target bitrate for extraction; and limiting the number of pairs extracted by the extractor to a threshold value variable in time as a function of the target bitrate.

14 Claims, 3 Drawing Sheets

(56) References Cited

U.S. PATENT DOCUMENTS

2011/0164679 A1 7/2011 Satou et al.
2013/0279813 A1* 10/2013 Pau .................. G06T 7/2033
     382/201

OTHER PUBLICATIONS

Search Report for Italian application serial No. TO20120986, Aug. 19, 2013, The Hague, Holland, 2 pages.

Danilo Pau, Rudolf Matavka, Arcangelo Bruna, Stefano Valle, Massimiliano Sitz, Mario Vigliar, "Proposal to complement mobile requirements with automotive and surveillance ones", International Organisation for Standardisation ISO/IEC JTC1/SC29/WG11 Coding of Moving Pictures and Audio, ISO/IEC JTC1/SC29/WG11 MPEG2012/m24695, May 2012, Geneva, Switzerland, 16 pages.

Anonymous, "Test Model 3: Compact Descriptors for Visual Search", International Organisation for Standardisation ISO/IEC JTC1/SC29/WG11 Coding of Moving Pictures and Audio, ISO/IEC JTC1/SC29/WG11/ W12929, Jul. 2012, Stockholm, Sweden, 35 pages.

Danilo Pau, Talha Soysal, Emanuele Plebani, Arcangelo Bruna, "CDVS Whitepaper: STM Proposal", International Organisation for Standardisation, SO/IEC JTC1/SC29/WG11, Coding of Moving Pictures and Audio, ISO/IEC JTC1/SC29/WG11 MPEG2012/m26509, Oct. 2012, Shanghai, China, 43 pages.

David G. Lowe, "Distinctive Image Features from Scale-Invariant Keypoints", International Journal of Computer Vision 60(2), pp. 91-110, Jan. 2004, 2004 Kluwer Academic Publishers. Manufactured in The Netherlands.

\* cited by examiner

METHOD FOR EXTRACTING FEATURES FROM A FLOW OF DIGITAL VIDEO FRAMES, AND CORRESPONDING SYSTEM AND COMPUTER PROGRAM PRODUCT

PRIORITY CLAIM

The instant application claims priority to Italian Patent Application No. TO2012A000986, filed 14 Nov. 2012, which application is incorporated herein by reference in its entirety.

TECHNICAL FIELD

The present description relates to techniques for extracting features from a flow of digital video frames.

Various embodiments may apply to image processing, for example, in the field of processes of matching and/or search and retrieval of images.

SUMMARY

Documents such as ISO/IEC JTC1/SC29/WG11/W12929, July 2012, Stockholm, Sweden, Test Model 3: Compact Descriptors For Visual Search, which is incorporated by reference, describe processing techniques (for example, with pipeline architecture) based upon the use of compact descriptors that can be used for functions of matching and retrieval of images.

The document in question does not, on the other hand, take into consideration the fact that the use of said descriptors, for example, for operations of matching or retrieval by a server, can be subject to constraints in terms of available bandwidth or bitrate. This situation can derive, for example, from limitations of the bandwidth available on a connection, from the variability of the data transmission rate, from phenomena of network congestion, or from considerations of various nature linked to the computational performance of the server.

Various embodiments are aimed at overcoming this deficiency.

Various embodiments may refer to a corresponding system, as well as to a computer-program product that can be loaded into the memory of at least one computer and includes parts of software code that are able to execute the steps of the method when the product is run on at least one computer. As used herein, reference to such a computer-program product is understood as being equivalent to reference to a computer-readable means containing instructions for controlling the processing system in order to co-ordinate implementation of a method according to an embodiment. Reference to "at least one computer" is evidently intended to highlight the possibility of an embodiment being implemented in modular and/or distributed form.

Various embodiments make it possible to fix the amount of features selected for each frame as a function of a target bitrate value with the consequent possibility of exploiting in an optimal and dynamic way the resources available in terms of bitrate for use of the corresponding descriptors.

Various embodiments enable compact descriptors to be encoded and sent to a server so as to be able to improve the performance in terms of precision and of channel occupation (and resources, in general) for example, by a bitstream of queries.

BRIEF DESCRIPTION OF THE DRAWINGS

Various embodiments will now be described, purely by way of non-limiting example, with reference to the annexed drawings, wherein.

DETAILED DESCRIPTION

In the ensuing description various specific details are illustrated, aimed at providing an in-depth understanding of various examples of embodiments. The embodiments may be obtained without one or more of the specific details, or with other methods, components, materials, etc. In other cases, known structures, materials, or operations are not illustrated or described in detail so that the various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of the present description do not necessarily refer to one and the same embodiment. Moreover, particular conformations, structures, or characteristics may be combined in any adequate way in one or more embodiments.

The references used herein are provided merely for the convenience of the reader and hence do not define the sphere of protection or the scope of the embodiments.

Figure 1:
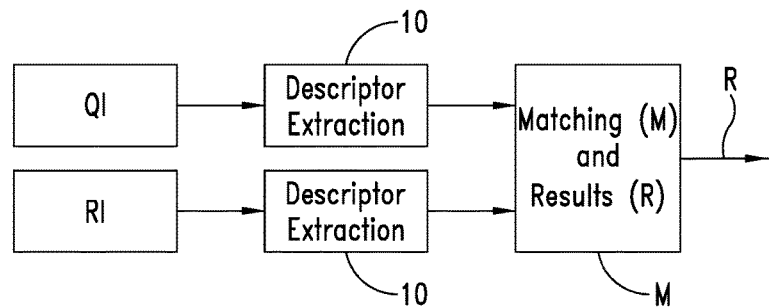
FIGS. 1 and 2 are functional block diagrams that illustrate possible functions of treatment of images based upon extraction of features.
Figure 2:
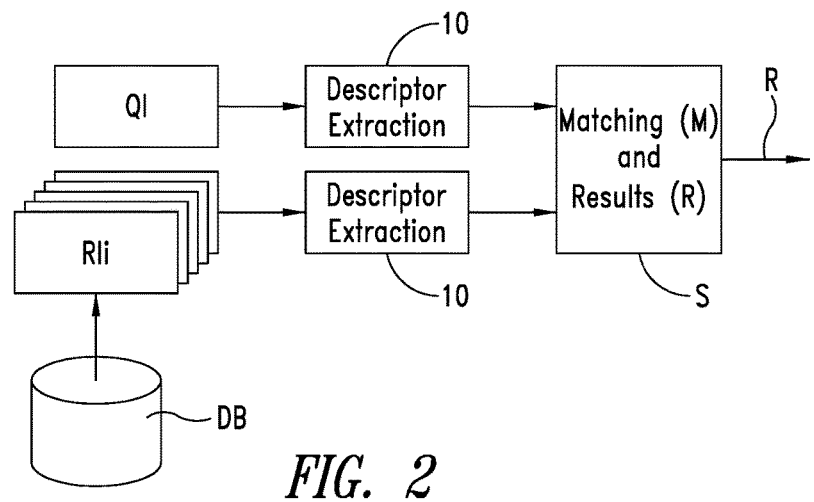
Figure 3:
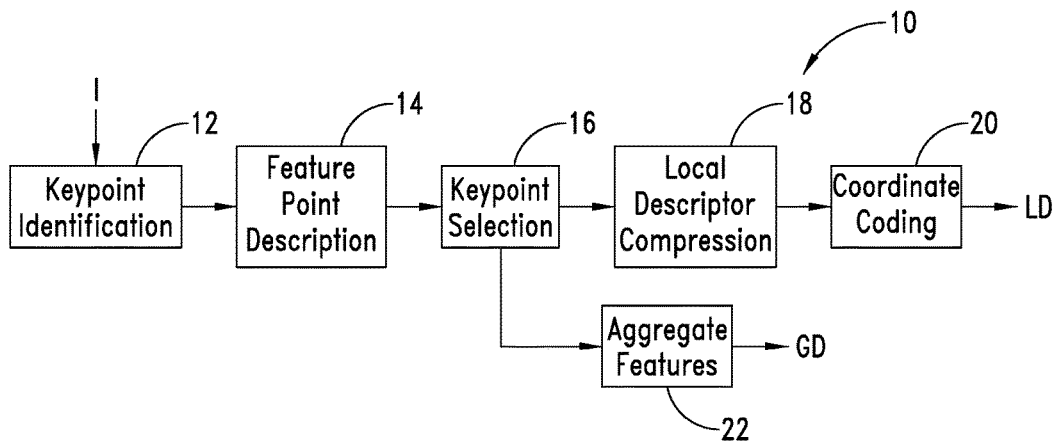
FIG. 3 is a functional block diagram that illustrates possible modalities of extraction of features.

FIGS. 1 to 3 are drawn from the document ISO/IEC JTC1/SC29/WG11/W12929, already referred to and incorporated by reference previously, and in particular from Section 1, Introduction, and from Section 2. Compact Descriptor Extraction of the document in question, which, in the subsequent Section 5. Software Architecture and Implementation Details illustrates examples of embodiment of an architecture for selection of the most significant features to be compressed in each digital video frame considered.

In particular, the diagrams of FIGS. 1 and 2 illustrate at the level of block diagram examples of functional architectures that can be used for performing a function of calculation of matching M or of search or retrieval S of digital video frames, i.e., of digital images.

In the first case (action of matching M of FIG. 1) it is possible to verify in an automated way (for example, via a computer) whether two images represent the same objects or the same scene. This is obtained by operating on a query image QI and on a reference image RI.

For this purpose, both of the images may be subjected to an operation of extraction of descriptors (designated as a whole by 10) and to an operation of comparison conducted in M by operating on said descriptors and features in 10, said operation of comparison being aimed at detecting the possible matching. The result of the processing operation, designated by R, indicates whether or not the query image QI represents the same objects or the same scene, i.e., matches the reference image RI.

The function of retrieval to which FIG. 2 schematically refers basically operates according to the same criteria with the difference represented by the fact that, in the case of FIG.

2, the comparison in S is made with a number of reference images $RI_i$ extracted from a data base DB. In this way, it is possible to search and retrieve, within the data base DB, one or more images that reproduce the same objects or the same scene as the query image QI.

Various architectures and technologies of components that are able to execute the functions illustrated with reference to FIGS. 1 and 2 are defined in the so-called Test Model 3.0 (TM3) for Compact Descriptors for Visual Search (CDVS): the model TM3 implements the functions required for extraction and comparison of compact descriptors limited to a set of predetermined descriptor lengths.

FIG. 3 illustrates a possible block diagram of a processing system (for example, structured as pipeline) for extracting features from video frames.

In various embodiments, a compact descriptor of an image I (which, in more general terms, may be viewed in the form of digital video frames), may include, in addition to a certain number of local descriptors, also a single global descriptor that can represent the image as a whole.

The diagram of FIG. 3 illustrates an example of architecture that enables production of a compact descriptor of an image/frame according to the model TM3 through a sequence of processing steps.

In the diagram of FIG. 3, the reference 12 designates a function/module for identifying interest points or keypoints in an image based upon a multiscale representation that can be obtained, for example, with a Differences-of-Gaussians (DoG) technique.

In the diagram provided by way of example in FIG. 3, the DoG function/module 12 is followed by a function/module 14, in which the so-called feature points are described, for example, with a scale-invariant feature transform (SIFT).

In the diagram provided by way of example in FIG. 3, the results of the action of transform carried out in 14 are fed to a function/module 16 for selecting the keypoints and associated local descriptors, which are to perform a function for selecting the features.

For example, in various embodiments, the function/module 16 may assign a positive value to each feature as a function of its DoG characteristics, of the corresponding SIFT vector, and of its co-ordinates.

For example, in the case where the n-th feature of an image is designated by $s_n$ (with a connotation that incorporates the DoG characteristics, the SIFT vector, and the corresponding co-ordinates), it is possible to designate by r a quantity indicating the key-point relevance. In this way, to a given feature it is possible to associate a value $r(s_n)$, and the aforesaid relevance values may be ordered in a decreasing scale and proceeding in such a way that, for example, only the first L features $n_1, \ldots, n_L$ are kept so as to be able to maintain the average length of the sequence within a certain length limit.

The result of the processing operation performed in 16 (i.e., selection of a limited number of keypoints that is able to maximize a measurement of the expected quality as a function of the use envisaged—for example, for actions of matching or search, as exemplified in FIGS. 1 and 2) may be subjected, in a function/module 18, to a compression of the local descriptors, i.e., a scalar or vector quantization of the features selected in 16.

The result of the processing operation performed in 18 is then transmitted to a function/module 20 for compressing the co-ordinates, which compresses the co-ordinates of the keypoints selected so as to generate the local descriptors LD at output.

The result of the processing operation performed in 16 can then be sent also to a function/module 22 that performs a function of aggregation of the features (for example, SIFT) so as to form a global descriptor GD.

Possible criteria of implementation of the diagram exemplified in FIG. 3 are described in detail in the document ISO/IEC JTC1/SC29/WG11/W12929, already repeatedly cited, also in the light of the article by D. G. Lowe: "Distinctive Image Features from Scale-Invariant Key points", International Journal of Computer Vision, 60, 91-110 (2004), which is incorporated by reference. For reasons of brevity, the corresponding detailed description is hence not repeated herein, also because in itself it is not essential for the purposes of understanding the embodiments.

Figure 4:
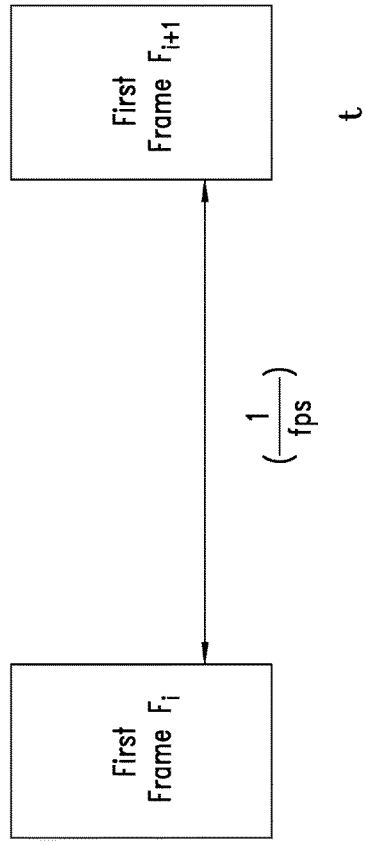
FIG. 4 is a block diagram generically illustrating a possible context of application of embodiments.

The diagram of FIG. 4 refers to a possible application of processing and treatment of digital video frames (for example, as functions of matching or search/retrieval, as described previously) implemented on a flow of video frames in which there may be identified a first frame $F_i$ and a second frame $F_{i+1}$ here considered for simplicity separated by a time interval 1/fps where fps is the number of frames per second in the flow of video frames considered: it will be appreciated on the other hand that, in various embodiments, the frames $F_i$ and $F_{i+1}$ may not even be consecutive with respect to one another in the flow, and may namely be separated by multiples of 1/fps.

In various embodiments, a matching function as considered herein may find application also in a technique of encoding of a flow of digital video frames as described in Italian Patent Application No. TO2012A000985, entitled "A method of encoding and decoding flows of digital video frames, related systems and computer program products" which was filed on 14 Nov. 2012, and which is incorporated by reference.

To return to what has been mentioned previously with reference to FIGS. 1 to 3 (and to the detailed illustration provided in the documents ISO/IEC JTC1/SC29/WG11/W12929 and Lowe referred to previously), the extraction of the descriptors implemented in the architecture described by way of example with reference to FIG. 3 may be reduced to a generation of respective sequences (e.g., the sequences used in M and S to compare the query images QI with the reference images RI and RIi) comprising a set of value pairs $[KP_{1i}, D_{1i}], [KP_{2i}, D_{2i}], \ldots, [K_{mi}, D_{mi}]$ in which associated with the keypoints $KP_{1i}, KP_{2i}, \ldots KP_{mi}$, are the corresponding descriptors $D_{1i}, D_{2i}, \ldots, D_{mi}$.

Such a sequence may be compressed to a limited number of bits by limiting the number of the pairs included in the sequence. For example, the number m of the pairs may be limited to a threshold value $T_i$ for each frame, i.e., $m=1, \ldots, T_i$ for the frame $F_i$ with the corresponding number of bits limited to a value $num\_bits_i$, with the threshold $T_i$ that identifies in practice the number of keypoint/descriptor pairs reached, to which each further pair, even though relevant, would not contribute to generating bits in a corresponding sequence or, alternatively, would be compressed to 0 bits.

Figure 5:
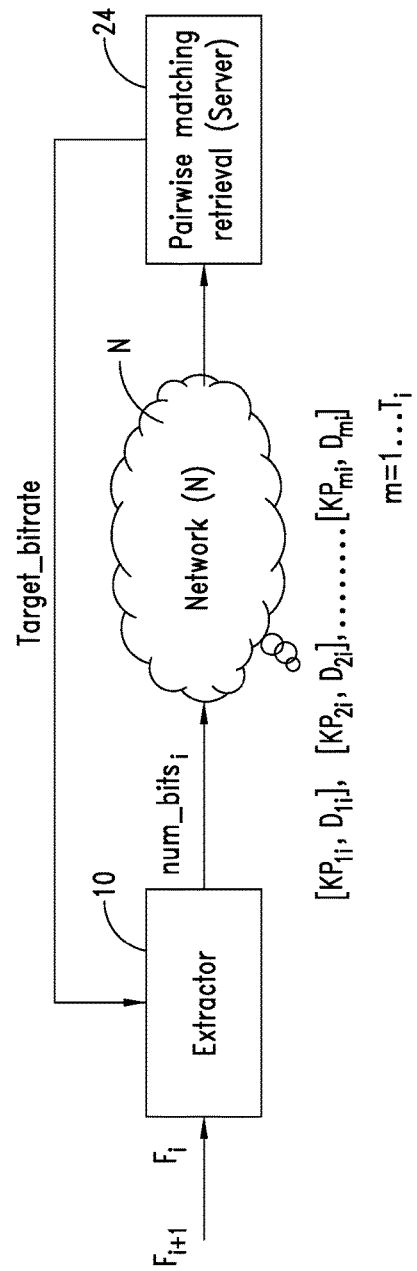
FIG. 5 is a block diagram representing the general architecture of examples of embodiments.

As illustrated in FIG. 5, in various embodiments, the result of the action of extraction, i.e., the sequence of pairs of keypoints and corresponding descriptors $[KP_{1i}, D_{1i}], [KP_{2i}, D_{2i}], \ldots, [KP_{mi}, D_{mi}]$ may be sent from the extractor module 10 to a server 24 that is to use the aforesaid sequences for a processing function.

As example, with reference once again to FIGS. 1 and 2, it is possible to consider contexts of use in which the sequences $[KP_{1i}, D_{1i}], [KP_{2i}, D_{2i}], \ldots, [KP_{mi}, D_{mi}]$ extracted from the query images QI are sent to a server 24, which performs the functions of matching M or retrieval S by operating on homologous sequences inherent in the reference images RI or Rii, for example, resident on the server 24 itself.

The transmission of the sequences of queries $[KP_{1i}, D_{1i}]$, $[KP_{2i}, D_{2i}], \ldots, [KP_{mi}, D_{mi}]$ may take place on a transmission channel constituted, for example, by a real or virtual channel within a network N, with an available band or bitrate that is not constant, but is variable in time, for example, owing to phenomena of congestion of the network N and/or owing to variation of the signal-to-noise or signal-to-interference ratio on the transmission channel (typical case of wireless networks). Consequently, the bitrate that the server 24 can have available for processing may vary and be variously limited in time.

Once again by way of example, in addition or as an alternative, there may arise situations in which the bitrate that the server 24 can have available for processing may vary owing to phenomena linked to the server itself, for example, of excessive computational overload, because the server 24 operates in multitasking and the bitrate that can be allocated to processing of the queries received may vary in time according to the load and the scheduling of the tasks.

FIG. 5 exemplifies the fact that, in various embodiments, the current value of available bitrate at the server 24 (designated as Target_bitrate) is transmitted from the server 24 to the extractor 10.

Figure 6:
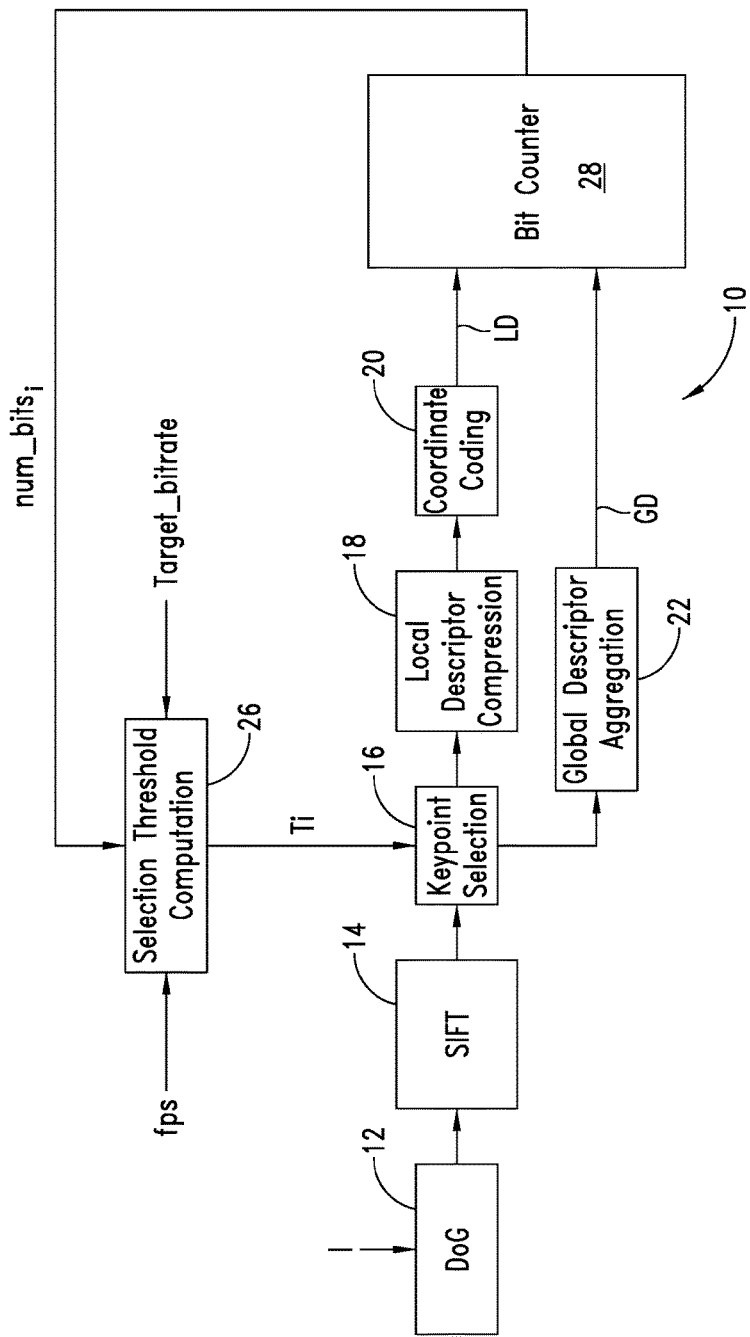
FIG. 6 is a block diagram that illustrates examples of embodiments with direct reference to the diagram of FIG. 3.

As illustrated schematically in FIG. 6 (where parts and components that are identical or equivalent to the ones already described with reference to FIG. 3 are designated by the same references that appear in FIG. 3), in various embodiments the value Target_bitrate may be used in a function/module 26 for calculating the selection-threshold value Ti used by the extractor 10, for example, in 16, for selecting the keypoints and limiting the number m=1, $T_i$ of the pairs $[KP_{1i}, D_{1i}], [KP_{2i}, D_{2i}], \ldots, [KP_{mi}, D_{mi}]$ extracted for the generic frame $F_i$ so as to limit the corresponding number of bits accordingly to the value $num\_bits_i$.

In various embodiments, the calculation may thus be performed adaptively, by setting an upper limit on the number of keypoint/descriptor pairs generated by the extractor 10 as a function of the value Target_bitrate: this value identifies the capacity by the server 24 of receiving and processing said sequences. In various embodiments, the aforesaid action of limitation avoids occupying of the extractor 10 in extraction of keypoint/descriptor pairs that, at the moment, the server 24 could not receive or, even if it could receive them, would not manage to process them.

In various embodiments, the function/module 26 may be configured for generating the aforesaid threshold value Ti as a function of the bitrate value Target_bitrate indicated as available by the server 24 (a value that is assumed as being variable in time, ideally from frame to frame, even though the corresponding variations are usually slower) taking into account also two other parameters, namely:

the parameter fps, i.e., the number of frames per second in the flow of frames at input to the block 12; and the number of bits $num\_bits_i$ used for compressing the keypoint/descriptor pairs, detected, for example, by a bit counter 28 that is able to "feel" or "sense" the descriptors LD and GD.

In various embodiments, the module 26 may operate according to the criteria outlined below.

Starting from the number bit $num\_bits_i$ used for "encoding" (i.e., for expressing) the keypoint/descriptor pairs for the frame $F_i$, it is possible to determine an average number of bits $average\_bit\_pair_i$: the number of bits used for each pair may in fact be different from pair to pair, for example, as a function of the characteristics of the individual descriptor.

For the aforesaid average number $average\_bit\_pair_i$ there may apply the following expression:

$$average\_bit\_pair_i = num\_bits_i / T_i$$

Starting from the quantity Target_bitrate received by the server 24, it is likewise possible to calculate a value of target bits for each frame $Target\_F_i$, which may be expressed as:

$$Target\_F_i = Target\_bitrate/fps$$

It is then possible to calculate, with reference to the generic frame $F_i$, the difference $$\delta_i = Target\_F_i - num\_bits_i$$

i.e., the difference (with sign) between the value of target bits for the i-th frame and the effective number of bits effectively used for "encoding" the frame in question.

The absolute value of the difference $\delta_i$ indicates by how much the action of extraction performed by the extractor 10 deviates from the capacity of reception/processing of the server 24, and the sign identifies the direction of the deviation:

positive, if the server 24 can receive/process more than the extractor 10 sends it;

negative, if the server 24 is not able to receive/process what the extractor 10 sends it.

As a function of the difference $\delta_i$ it is then possible to establish a target value $Target\_F_{i+1}$ defined as $$Target\_F_{i+1} = Target\_F_i + \delta i$$

i.e., by adding to or subtracting from the encoding process, as this is currently implemented by the extractor 10, a number of bits equal to $\delta_i$, for example, calculating a new threshold value $T_{i+1}$ for the number of keypoint/descriptor pairs to be used for the subsequent frame $F_{i+1}$, for example, on the basis of the relation:

$$T_{i+1} = target\_F_{i+1}/average\_bit\_pair_i$$

In various embodiments, the parameter average_bit_pair could be estimated for the frame i+1 with a first encoding attempt and then be applied in a second actual encoding step. Furthermore, $\delta_i$ may be scaled by a scalar less than one so as to increase the stability of the effective feedback loop that controls the target number of bits target_$F_i$ per frame. In addition, although the above embodiments are described in terms of frames, these embodiments are applicable to any other type of sequence of images such as interlaced image fields in a progressive video sequence.

Of course, without prejudice to the principles disclosed herein, the details of construction and the embodiments may vary, even significantly, with respect to what is illustrated herein purely by way of non-limiting example, without thereby departing from the sphere of protection.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising:
   a generator circuit configured to generate, for each data block in a sequence of data blocks, a respective at least one value that represents a respective feature of the data block;

a receiver circuit configured to receive a target rate;
a rate circuit configured to adjust, in response to the target rate, a generation rate at which the generator generates the values;
wherein the target rate includes a target bit rate per unit of time; and
wherein the rate circuit is configured:
to convert the target bit rate per unit of time into a target bit rate per data block,
to determine one of a number of bits in the at least one value generated for a data block and an average number of bits in the at least one value generated for a data block, and
to adjust the generation rate in response to one of a difference between the target bit rate per data block and the number of bits and a difference between the target bit rate per data block and the average number of bits.

2. The apparatus of claim 1 wherein each data block in the sequence of data blocks includes a respective image in a sequence of images.

3. The apparatus of claim 1 wherein each data block in the sequence of data blocks includes a respective frame in a sequence of frames.

4. The apparatus of claim 1 wherein each of the at least one value includes a point of interest of the respective data block and a descriptor of the point of interest.

5. The apparatus of claim 4 wherein the descriptor includes a location of the point of interest within the respective data block.

6. The apparatus of claim 1, further comprising:
a transmitter circuit configured to transmit the values to a destination; and
wherein the receiver is configured to receive the target rate from the destination.

7. The apparatus of claim 6 wherein the target bit rate includes a rate that is related to a rate at which the destination process the values.

8. The apparatus of claim 1 wherein the rate circuit is configured to adjust the generation rate in response to a difference between the target rate and the generation rate.

9. A method, comprising:
generating at a generation rate, for each data block in a sequence of data blocks, a respective set of at least one value that represents a respective feature of the data block;
receiving a target rate;
adjusting the generation rate in response to the target rate;
wherein the target rate includes a target bit rate per unit of time;
converting the target bit rate per unit of time into a target bit rate per data block;
determining either a number of bits in the at least one value generated for a data block and an average number of bits in the at least one value generated for a data block; and
adjusting the generation rate in response to either a difference between the target bit rate per data block and the number of bits and a difference between the target bit rate per data block and the average number of bits.

10. The method of claim 9 wherein each data block in the sequence of data blocks includes a respective image in a sequence of images.

11. The method of claim 9, further comprising receiving the sequence of data blocks.

12. The method of claim 9 wherein each of the at least one value includes a point of interest of the respective data block and a descriptor of the point of interest.

13. The method of claim 9, further comprising:
transmitting the sets to a computing circuit; and
wherein receiving the target rate includes receiving the target rate from the computing circuit.

14. The method of claim 9, further comprising adjusting the generation rate in response to a difference between the target rate and the generation rate.

* * * * *